United States Patent [19]

Scherer et al.

[11] Patent Number: 5,656,386
[45] Date of Patent: Aug. 12, 1997

[54] ELECTROCHEMICAL CELL WITH A POLYMER ELECTROLYTE AND PROCESS FOR PRODUCING THESE POLYMER ELECTROLYTES

[75] Inventors: Günther G. Scherer, Hägglingen; Felix N. Büchi, Zollikofen, both of Switzerland; Bhuvanesh Gupta, New Delhi, India

[73] Assignee: Paul Scherrer Institut, Villigen PSI, Switzerland

[21] Appl. No.: 432,124

[22] PCT Filed: Aug. 26, 1994

[86] PCT No.: PCT/CH94/00167

§ 371 Date: May 4, 1995

§ 102(e) Date: May 4, 1995

[87] PCT Pub. No.: WO95/07553

PCT Pub. Date: Mar. 16, 1995

[30] Foreign Application Priority Data

Sep. 6, 1993 [CH] Switzerland ............ 02 636/93

[51] Int. Cl.⁶ .................. H01M 8/10; H01M 6/16; H01M 6/18
[52] U.S. Cl. .................. 429/33; 429/192; 204/263; 204/277; 204/283
[58] Field of Search ............ 429/33, 192; 204/263, 204/277, 283

[56] References Cited

U.S. PATENT DOCUMENTS

| | | | |
|---|---|---|---|
| 4,113,922 | 9/1978 | D'Agostino et al. | 429/33 |
| 4,337,137 | 6/1982 | Ezzell | 204/252 |
| 4,469,579 | 9/1984 | Covitch et al. | 204/283 |

(List continued on next page.)

FOREIGN PATENT DOCUMENTS

| | | |
|---|---|---|
| 0140544 | 5/1985 | European Pat. Off. . |
| 0483085 | 4/1992 | European Pat. Off. . |
| 0572810 | 12/1993 | European Pat. Off. . |

(List continued on next page.)

OTHER PUBLICATIONS

F.N. Bücki et al, "Radiation Grafted and Sulfonated (FEB-–g–Polystyrene)—An Alternative to Perfluorinated Membranes for PEM Fuel Cell?".
Proceedings of the 27th Intersociety Energy Conversion Engineering Conference, vol. 3 (Aug. 1992) 3419–3424.

(List continued on next page.)

Primary Examiner—Kathryn Gorgos
Assistant Examiner—John S. Starsiak, Jr.
Attorney, Agent, or Firm—Cushman Darby & Cushman IP Group of Pillsbury Madison & Sutro LLP

[57] ABSTRACT

The electrochemical cell comprises a pair of electrodes (2a, 2b) whose electrode body (3a, 3b) consists of porous base material with a catalyst deposited on carbon particles. Between the electrodes, a membrane film (4) made of a hydrophillic, proton-conducting polymer material is arranged which acts as electrolyte and separator. The material of the membrane film (4) is a base polymer which is radiation-grafted with terminally sulphonated vinyl radicals and is selected from the group formed by substituted and unsubstituted polyolefins, substituted and unsubstituted vinyl polymers and their copolymers, the vinyl radicals being derived from vinyl monomers which are selected from the group formed by substituted and unsubstituted vinyl monomers. Between the membrane film and the base material with the catalyst deposited thereon an interlayer is provided which comprises a proton-conducting hydrophillic copolymer of poly(perfluoroalkylene) which is substituted with ion-exchanging groups, and poly(perfluoroalkylene) which is substituted with non-ion-exchanging groups.

15 Claims, 1 Drawing Sheet

U.S. PATENT DOCUMENTS

| | | | |
|---|---|---|---|
| 4,506,035 | 3/1985 | Barnett et al. | 521/53 |
| 4,537,668 | 8/1985 | Gaussens et al. | 204/159.17 |
| 4,605,685 | 8/1986 | Momose et al. | 522/124 |
| 4,804,592 | 2/1989 | Vanderborgh et al. | 429/33 |
| 4,876,115 | 10/1989 | Raistrick | 427/115 |
| 4,909,912 | 3/1990 | Oda et al. | 204/283 X |

FOREIGN PATENT DOCUMENTS

| | | | |
|---|---|---|---|
| 1143883 | 2/1969 | United Kingdom . | |
| 2088883 | 6/1982 | United Kingdom | C08J 5/22 |
| 9215121 | 9/1992 | WIPO . | |
| WO9215121 | 9/1992 | WIPO | H01M 8/10 |
| WO9507553 | 3/1995 | WIPO . | |

OTHER PUBLICATIONS

Proceedings of the 27th Intersociety Energy Conversion Engineering Conference, IECEC–92, San Diego, Ca., Aug. 3–7, 1992 no month available, P–259, vol. 3, pp. 3.419–3.424, "Radiation Grafted and Sulfonated (FEP–g–Polystyrene)—An Alternative to Perfluorinate Membranes for PEM Fuel Cells?".

Asawa, T., *Journal of Aplied Electrochemistry*, "Material properties of cation exchange membranes for chloralkali electrolysis, water electrolysis and fuel cells", 1989 no month available, pp. 566–570.

*Chemical Abstracts*, 52–Energy Technology, 108: 41131k, "Fuel cells with ion–exchange membrane electrolyte". Iwaasa et al., p. 199 (with attached Patent Abstracts of Japan, regarding Publication No. JP62195855). no date available.

Scherer et al., *Int. J. Hydrogen Energy*, vol. 17, No. 2, pp. 115–123, 1992 no month available, "Radiation Grafted Membranes: Some Structural Investigations in Relation to Their Behavior in Ion–Exchange–Membrane Water Electrolysis Cells".

Guzman–Garcia et al., *Journal of Applied Electrochemistry*, "Analysis of Radiation–Grafted Membranes for Fuel Cell Electrolytes", vol. 22, 1992, no month available pp. 204–214.

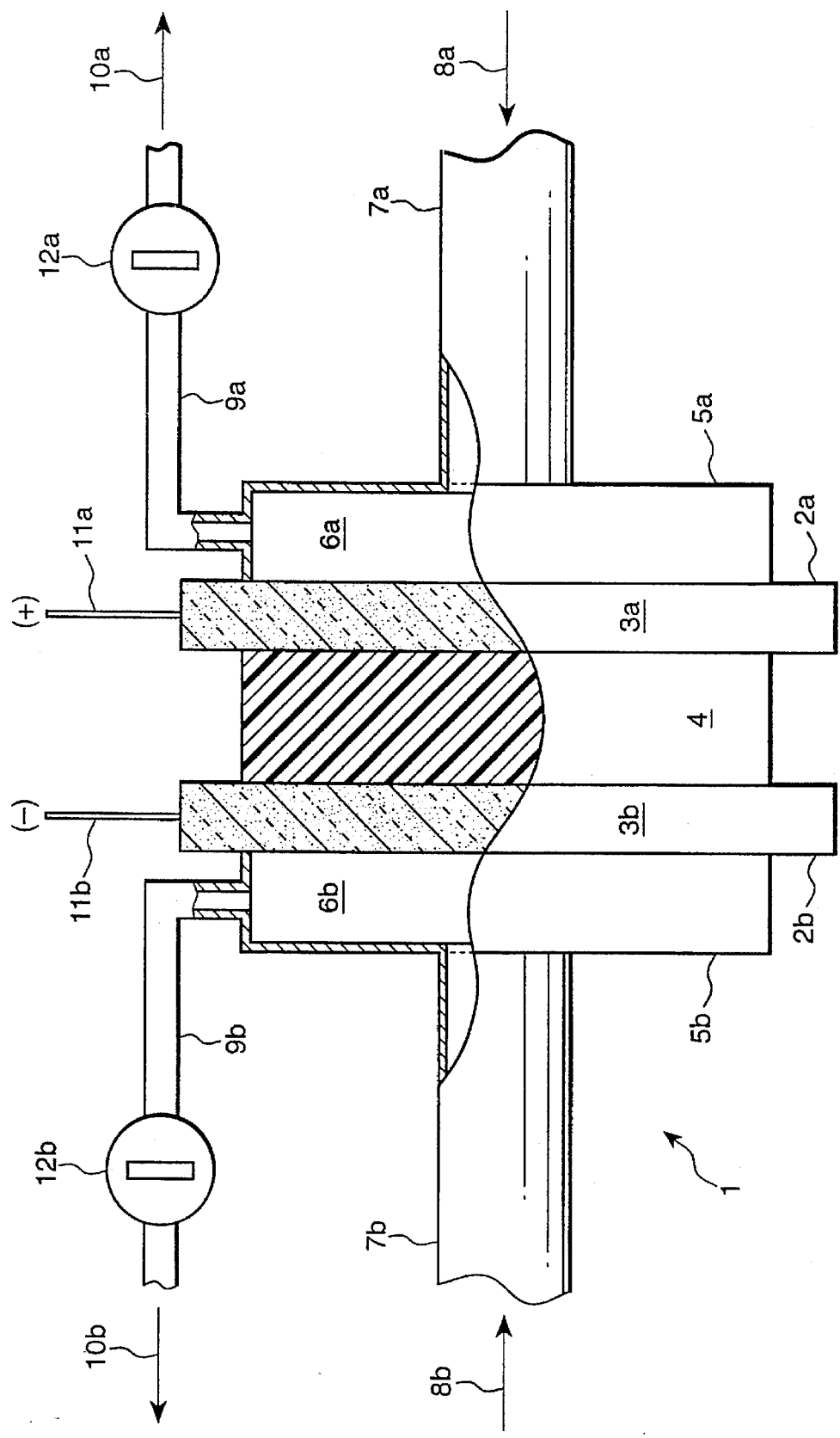

ELECTROCHEMICAL CELL WITH A POLYMER ELECTROLYTE AND PROCESS FOR PRODUCING THESE POLYMER ELECTROLYTES

BACKGROUND OF THE INVENTION

The invention relates to an electrochemical cell comprising a pair of electrodes each having one electrode body made of porous base material which essentially consists of carbon particles held together by a binder and has pores which permit percolation of fluid through the electrode body, and in which the electrode body is charged with a catalyst deposited on the base material, a membrane film which is arranged between the electrodes, contacts the two electrode bodies electrochemically, acts as an electrolyte and separator of the electrochemical cell and is made of a hydrophillic, proton-conducting polymer material, an interlayer being provided between the membrane film and the base material with the catalyst deposited thereon, means for introducing a fluid into at least one of the electrodes, means for passing out a fluid from at least one of the electrodes, and means for making electrical contact with the electrodes.

An electrochemical cell of the abovementioned type is known from U.S. Pat. No. 4,876,115. This known cell employs, as an electrolyte and separator, a membrane whose material is a polymer material comprising substituted poly (perfluoroalkylene), some of the substituents being terminally sulphonated. A membrane material preferred according to U.S. Pat. No. 4,876,115 is Nafion (trademark of DuPont), which is documented, inter alia, in Römpps Chemie Lexikon and is there referred to as a membrane material on the basis of poly(perfluoroalkylene)sulphonic acid. For listings of further membrane materials, reference is made in U.S. Pat. No. 4,876,115 to U.S. Pat. No. 4,337,137.

Such perfluorinated membrane materials in accordance with U.S. Pat. No. 4,876,115 exhibit, owing to their chemical composition, at temperatures up to 100° C., the long-term stability required for operating the electrochemical cell, but they are very expensive. Moreover, establishing satisfactory contact between such perfluorinated membrane materials and the electrodes is very laborious and difficult.

Hitherto, no other membrane materials have been disclosed which, in conjunction with distinctly more favourable production costs than for the perfluorinated membrane materials in accordance with U.S. Pat. No. 4,876,115, exhibit the desired long-term stability for the operation of electrochemical cells.

The thermally and temporally limited stability of membrane materials, in particular of membrane materials grafted with a styrene derivative and cross-linked with divinylbenzene, has been known for a long time, for example from "Introduction to SPE Cell Technology" by A. B. La Conti in "Proceedings of Oronzio de Nora Symposium", Venice, 15th to 18th May 1979, pages 94–127.

In this context, long-term stability is defined as follows: the membrane of an electrochemical cell is described as stable if the ohmic loss in the cell caused by the membrane resistance increases by less than 100 mV in 1000 hours at a current density of 1 A/cm$^2$.

On the other hand, the membrane materials known, for example, from U.S. Pat. Nos. 4,469,579, 4,506,035 or 4,605,685 do show the desired long-term stability, but are very expensive and therefore have not been applied on a major scale. These perfluoroalkylene polymers or perfluoroalkylene copolymers, radiation-grafted with an optionally fluorinated styrene radical and then sulphonated, would be desirable, however, as membrane materials for electrochemical cells given their mouldability, contactability and further beneficial properties.

The preparation of such polymers and their use as a membrane material for electrochemical cells is extensively discussed, for example, in "Radiation Grafted and Sulfonated (FEP-g-polystyrene)—An Alternative to Perfluorinated Membranes for PEM Fuel Cells?" by F. N. Büchi et al in "Proceedings of the 27th Intersociety Energy Conversion Engineering Conference, San Diego, Aug. 3–7, 1992, SAE Technical Paper Series 929293, pp. 3.419–3.423". F. N. Büchi et al report that the stability of their electrochemical cells at operating temperatures of 60° C. managed to reach more than 300 hours, but at 80° C. all the membranes studied (those of F. N. Büchi et al themselves and also those which they had obtained commercially for comparative purposes) suffered rapid degradation. Thus none of the electrochemical cells studied by F. N. Büchi et al exhibited adequate long-term stability.

An electrochemical cell of the type mentioned at the outset is known from "Chemical Abstracts" 108(6):41131k and JP-A-62-195855. The membrane film consists of ion-exchanging polystyrene material Selemion CMV (trademark of Asahi Gaishi). On each of the two surfaces of the membrane film a layer of sulphonated polystyrene is formed by grafting. The electrodes and their base material, with the catalyst deposited thereon, are impregnated with a solution of the ion-exchanging sulphonated material Nafion (trademark of DuPont). Then the electrochemical cell is assembled by the electrodes being joined to the membrane film on both sides. Thus, on both sides of the membrane film between it and the impregnated electrode, an interlayer is formed which consists of sulphonated polystyrene which, according to the documents cited, is a gel, so that the interlayer penetrates into the electrode and ensures an effective bond between the membrane film and the electrode impregnated with Nafion. This ensures that no "sulphuric acid" can leak out—in the cited documents this obviously refers to the possible break-down products of the membrane such as, for example, toluenesulphonic acid. While this known electrochemical cell does solve the problem of long-term behaviour with respect to leakage of "sulphuric acid", the problem of long-term behaviour in operation above room temperature is not addressed at all in the cited documents.

It is also known, from EP-A-0483085, to impregnate the electrodes, or their base material with the catalyst deposited thereon, with a solution of the ion-exchanging sulphonated material Nafion (trademark of DuPont). This disclosure reports solely on the short-term behaviour of the electrochemical cell at a slightly elevated temperature and solely with the expensive material Nafion, it therefore provides no contribution to the solution of the problem of long-term behaviour in operation above room temperature with a cost-effective material.

"Radiation Grafted Membranes: Some Structural Investigations in Relation to their Behavior in Ion-Exchange-Membrane Water Electrolysis Cells" by G. G. Scherer et al in Int. J. Hydrogen Energy, 17/2 (1992) pp. 115–123 discloses the use, as the material of the membrane film, of a base polymer radiation-grafted with terminally sulphonated vinyl radicals, the base polymer used being, on the one hand, a poly(tetrafluoroethylene) (PTFE), on the other hand a low-density polyethylene (LDPE). The long-term behaviour of the electrochemical cells fabricated therewith was studied only at room temperature in the case of the LDPE-based material. In the case of the PTFE-based material comprising styrene as the vinyl radical, the electrochemical cells failed at a temperature as low as 53° C. While in the case of the PTFE-based material comprising trifluorostyrene as the vinyl radical the electrochemical cells did prove themselves in terms of long-term behaviour above room temperature, the material in question is expensive. Therefore this disclosure likewise provides no contribution to the solution of the problem of long-term behaviour in operation above room temperature with a cost-effective material.

SUMMARY OF THE INVENTION

It is therefore an object of the invention to propose an electrochemical cell of the type mentioned in the opening paragraph of the BACKGROUND section, above, which in its operation, in particular above room temperature, makes it possible, employing more cost-effective membrane materials than hitherto, to achieve adequate long-term stability.

To achieve this object, an electrochemical cell of the type mentioned in the opening paragraph of the BACKGROUND section, above is characterized in that the material of the membrane film is a base polymer radiation-grafted with terminally sulphonated vinyl radicals, the base polymer being selected from the group formed by substituted and unsubstituted polyolefins, substituted and unsubstituted vinyl polymers and their copolymers and the vinyl radicals being derived from vinyl monomers which are selected from the group formed by substituted and unsubstituted vinyl monomers, and is moreover characterized in that the interlayer comprises a proton-conducting hydrophillic copolymer of poly(perfluoroalkylene) which is substituted with ion-exchanging groups, and poly(perfluoroalkylene) which is substituted with non-ion-exchanging groups.

In this arrangement, the interlayer preferably has been applied to the membrane film and/or in the case of at least one of the electrode bodies preferably envelops the base material with the catalyst deposited thereon, the electrode body being impregnated in its pores with the proton-conducting hydrophillic copolymer.

Preferably, in this arrangement the base polymer is a polyolefin selected from the group formed by polyethylene, polypropylene, poly(tetrafluoroethylene), copolymer of poly(tetrafluoroethylene) and polyethylene, and copolymer of poly(tetrafluoroethylene) and poly(hexafluoropropylene) or a vinyl polymer selected from the group formed by poly(vinyl fluoride), poly(vinyl chloride) and poly(vinylidene difluoride), while the vinyl monomer is preferably selected from the group formed by styrene, α-fluorostyrene, α-methylstyrene and para-chloromethylstyrene.

Preferably, the vinyl radicals radiation-grafted to the base polymer are cross-linked by radicals derived from a cross-linking agent, the cross-linking agent preferably being selected from the group formed by divinylbenzene and triallyl cyanurate and mixtures thereof, the material of the membrane film preferably containing radiation-grafted vinyl monomer radicals and cross-linking agent radicals in a relative weight ratio with respect to one another of up to approximately 60:40.

Preferably the material of the membrane film contains from 15 to 45% by weight of radiation-grafted vinyl monomer radicals.

Preferably, the membrane film has a thickness of more than approximately 50 μm, in particular of from 80 to 170 μm.

The electrochemical cell is preferably either a fuel cell, one of the means for introducing a fluid being designed as a means for introducing a gaseous fuel into the one electrode, another of the means for introducing a fluid being designed as a means for introducing a gaseous oxidant into the other electrode, one of the means for passing out a fluid being designed as a means for passing out reaction products from the combustion reaction between the fuel and the oxidant from the one electrode, and optionally another of the means for passing out a fluid being designed as a means for passing out inert gases, which have been supplied with the gaseous oxidant, from the other electrode, or is an electrolytic cell, the means for introducing a fluid being designed as a means for introducing a starting material to be electrolysed, and the means for passing out a fluid being designed as a means for passing out reaction products from the electrochemical decomposition of the starting material.

The electrochemical cell may also be alternatively operable as a fuel cell or an electrolytic cell.

A process for preparing the material of the membrane film of this electrochemical cell is characterized by the process steps of: selecting a base polymer to be modified, from the group formed by substituted and substituted polyolefins, substituted and unsubstituted vinyl polymers and their copolymers; selecting a vinyl monomer from the group formed by substituted and unsubstituted vinyl monomers; carrying out a grafting reaction of the base polymer with the vinyl monomer in a mixture thereof by exposing the mixture to electromagnetic radiation to form the radiation-grafted polymer; and sulphonating the radiation-grafted polymer.

A first preferred design variant of this process comprises the process steps of adding and blending the vinyl monomer into the base polymer to form the mixture, and carrying out the grafting reaction in the mixture by exposing the mixture to electromagnetic radiation.

A second preferred design variant of this process comprises the process steps of irradiating the base polymer with electromagnetic radiation to form a graftable intermediate polymer, cooling the intermediate polymer to a temperature below 0° C., adding and blending the vinyl monomer into the cool graftable intermediate polymer to form a cool mixture, and carrying out the grafting reaction in the mixture by raising the temperature of the mixture to at least 20° C.

A third preferred design variant of this process comprises the process steps of adding and blending the vinyl monomer and the cross-linking agent into the base polymer to form a mixture, and carrying out the grafting reaction by exposing the mixture to electromagnetic radiation while at the same time a cross-linking reaction of the vinyl radicals radiation-grafted onto the base polymer takes place by means of the cross-linking agent to form the cross-linked radiation-grafted polymer.

A fourth preferred design variant of this process comprises the process steps of irradiating the base polymer with electromagnetic radiation to form a graftable intermediate polymer, cooling the intermediate polymer to a temperature below 0° C., adding and blending the vinyl monomer and the cross-linking agent into the cool graftable intermediate polymer to form a cool mixture, and carrying out the grafting reaction in the mixture by raising the temperature of the mixture to at least 20° C. while at the same time a cross-linking reaction of the vinyl radicals radiation-grafted onto the base polymer takes place by means of the cross-linking agent to form the cross-linked radiation-grafted polymer.

The electrochemical cells according to the invention quite surprisingly achieve adequate long-term stability. The ohmic loss due to the membrane resistance in the electrochemical cells according to the invention rises by less than 100 mV over a period of approximately 1000 hours at a current density of approximately 1 A/cm$^2$ and an operating temperature up to approximately 80° C. As has just been said, this result comes as a complete surprise, since, after all, not only was the electrochemical cell membrane film material defined in the invention known, but this was also true of its use in electrochemical cells, and it was also known that this material did not provide adequate long-term stability of the electrochemical cells.

It should be noted in this context that the abovementioned disclosure by F. N. Büchi et al emphasizes quite strongly (in italics and bold type) that no special treatment and, in particular, no impregnation of the electrodes took place in the studies and experiments described therein.

Consequently, it was not to be expected and it is therefore surprising that the use of this material, which was known per se, in an electrochemical cell provided with specially designed electrodes, whereby not only the electrochemical cell, but also this special design of their electrodes were known per se, would lead to adequate long-term stability of the electrochemical cell according to the invention.

The invention enables the fabrication of an electrochemical cell whose membrane film which acts as electrolyte and separator of the electrochemical cell, is considerably less expensive than in the case of the previous electrochemical cells, for example those provided with Nafion (trademark of DuPont), the result being that for an approximately equal capacity under approximately identical operating conditions the costs of the electrochemical cells are distinctly reduced. Typically, under identical operating conditions and at a cell voltage of approximately 0.5 V, an electrochemical cell according to the invention provides an output of 205 mW/cm$^2$, and a conventional cell in accordance with U.S. Pat. No. 4,876,115 comprising the membrane material Nafion 117 (trademark of DuPont) provides an output of 225 mW/cm$^2$, the outputs obtained therefore being essentially comparable.

Considerably easier and more cost-effective and consequently particularly advantageous is the procedure known from U.S. Pat. No. 4,605,685, in which the mixture to be grafted is first made into a film and the grafting reaction is then carried out in the film, optionally together with the cross-linking reaction.

When preparing the material of the membrane film of the electrochemical cell according to the invention it is likewise possible to proceed as described in U.S. Pat. No. 4,605,685. For example, a mixture is used which, as the base polymer, contains a copolymer of poly(tetrafluoroethylene) and poly(hexafluoropropylene), as the vinyl monomer contains styrene and as the cross-linking agent contains divinylbenzene. This mixture is made into a film having a thickness of approximately 50 μm and is irradiated with the gamma radiation of a Co$^{60}$ source, in order to graft the styrene onto the copolymer and to cross-link the copolymer with the divinylbenzene. The irradiation is carried out using a radiation dosage of, for example, from 2 to 10 Mrad, if irradiation takes place prior to grafting and cross-linking, or from 0.1 to 1 Mrad, if grafting and cross-linking take place during irradiation. Grafting and cross-linking take place, for example, at a temperature of from 40° C. to 80° C. over a period of from 10 to 60 hours.

Then the radiation-grafted, cross-linked intermediate material thus obtained is terminally sulphonated as described in U.S. Pat. No. 4,605,685, for example at a temperature of from 40° C. to 90° C. over a period of from 1 to 10 hours.

The resulting material is used as electrolyte and separator in an electrochemical cell which can be constructed, for example, as disclosed in U.S. Pat. No. 4,876,115.

BRIEF DESCRIPTION OF THE DRAWING

Illustrative embodiments of the invention are described below in more detail with reference to the drawing, in which:

FIG. 1 schematically shows, not to scale and partially in section, a design of an electrochemical cell according to the invention.

DETAILED DESCRIPTION

As depicted in FIG. 1 and globally designated by 1, an electrochemical cell is provided with a pair of electrodes 2a, 2b. The electrodes 2a, 2b are shaped as essentially flat electrode bodies 3a, 3b. Between the electrodes 2a, 2b, or between the electrode bodies 3a, 3b, a membrane 4 formed as a film or sheet is inserted in the manner of a sandwich and is arranged in such a way that it makes electrochemical contact with the two electrode bodies 3a, 3b. The sandwich-like structure consisting of the electrode bodies 3a, 3b and the membrane 4 is pressed together between two approximately bell-shaped container sections 5a, 5b, said container sections 5a, 5b defining, together with the electrode bodies 3a, 3b, respective compartments 6a, 6b.

The electrode bodies 3a, 3b comprise porous base material and this, in turn, essentially comprises carbon particles held together by a binder and has pores which permit percolation of fluid through the electrode body and in which the electrode body is charged with a catalyst deposited on the base material as disclosed, for example, in U.S. Pat. No. 4,876,115.

Connected to the container sections 5a, 5b there are feeders 7a, 7b which are designed for the introduction of fluid, optionally under pressure, into the respective compartment 6a, 6b, as shown by the arrows 8a, 8b. The fluid is thus introduced into the electrodes 2a, 2b and passes through the porous electrode bodies 3a, 3b to the membrane 4 which thus acts as electrolyte and separator of the electrochemical cell 1. Likewise connected to the container sections 5a, 5b are offtakes 9a, 9b which, via the valves 12a, 12b, pass the fluid out from the respective compartment 6a, 6b, as shown by the arrows 10a, 10b. Depending on the desired mode of operation of the electrochemical cell 1, the fluid is therefore, in the compartments 6a, 6b, supplied to the electrode 2a, 2b in question or ducted away therefrom.

Finally, for the purpose of making electric contact with the electrodes 2a, 2b, electric leads 11a, 11b are provided which are embedded in the electrode bodies 3a, 3b or otherwise attached thereto, in order to connect, for example, the electrode 2a as the anode and the electrode 2b as the cathode.

The electrochemical cell 1 can be operated as a fuel cell. In this case the feeder 7a serves for the introduction of a gaseous fuel such as, for example, hydrogen, methane, natural gas and the like via the anode-side compartment 6a into the one electrode or anode 2a, whereas the feeder 7b serves for the introduction of a gaseous oxidant such as, for example, oxygen or air via the cathode-side compartment 6b into the other electrode or cathode 2b. At the same time, the offtake 9a serves for passing out reaction products of the combustion reaction between the fuel and the oxidant, for example carbon dioxide, from the one electrode or anode 2a via the anode-side compartment 6a, whereas the offtake 9b serves for passing out inert gases supplied together with the gaseous oxidant, essentially water and the nitrogen of the air, from the other electrode or cathode 2b via the cathode side compartment 6b.

The electrochemical cell 1 can also be operated as an electrolytic cell. In this case, one or both feeders 7a, 7b serve for the introduction of a starting material to be electrolysed such as, for example, water, aqueous hydrochloric acid solution and the like, via the respective compartment 6a, 6b into one or both electrodes 2a, 2b, whereas the offtake 9a serves for passing out reaction products of the electrochemical decomposition of the starting material, for example oxygen, ozone, chlorine and the like, from the one electrode or anode 2a via the anode-side compartment 6a, and the offtake 9b serves for passing out reaction products of the electrochemical decomposition of the starting material, essentially hydrogen, from the other electrode or cathode 2b via the cathode-side compartment 6b.

Finally, the electrochemical cell 1 may, as a combination of the two possibilities stated above, optionally be operated as a fuel cell or an electrolytic cell.

In a first design, the electrode bodies 2a, 3a or at least one of these may be impregnated, in essentially the same way as in U.S. Pat. No. 4,876,115, in the pores with a material which improves the efficiency of the electrochemical cell and is a proton-conducting hydrophillic copolymer of poly(perfluoroalkylene) which is substituted with ion-exchanging groups, and poly(perfluoroalkylene) which is substituted with non-ion-exchanging groups, while the membrane in turn comprises a hydrophillic proton-conducting polymer material which, as defined above, is an optionally cross-linked base polymer radiation-grafted with terminally sulphonated vinyl radicals. Thus, in at least one of the electrode bodies 2a, 3a, the base material, together with the catalyst deposited thereon in the pores of the electrode body, is enveloped by an interlayer made of the copolymer.

In a second design, this interlayer made of the copolymer may have been applied to the membrane film and cover it on one or both sides.

Working examples of the invention are given below. It should be understood that the invention is neither limited by these working examples or restricted to these working examples.

Moreover, the relative weight ratio between vinyl monomer radicals and cross-linking agent radicals, which results in Examples 8 to 14, is very difficult to determine. It was therefore indicated, in the examples, not directly as a weight ratio but indirectly via the volume ratio in the grafting solution.

EXAMPLE 1

Films having a thickness of 50 μm and made of a copolymer of tetrafluoroethylene and hexafluoropropylene (FEP) were irradiated in a $Co^{60}$ chamber with a dosage of 2 Mrad. Then the films were stored in a polyethylene bag at approximately −60° C. in a freezer for a number of days or weeks.

Such a film was placed into a glass vessel filled with a mixture of 60% by volume of styrene and 40% by volume of benzene, the glass vessel previously having been degassed by a number of freezing and thawing cycles. The glass vessel was then stored for 8 hours in a thermostat kept at 60° C. The glass vessel was then opened, the film was removed and extracted for 5 hours using toluene in a Soxhlet apparatus. Then the film was dried in vacuo and weighed. On the basis of the increase in weight, a degree of grafting of 15%, based on the initial weight of the FEP film, was calculated.

The grafted film was placed into a glass vessel which contained a mixture of 70% by volume of 1,1,2,2-tetrachloroethane and 30% by volume of chlorosulphonic acid. The film was sulphonated in this mixture, with stirring, at 80° C. for 5 hours. The film was then removed, washed and dried. The film thickness was now 57 μm. After a swelling operation in water, the thickness of the membrane film after swelling being approximately 80 μm, the film was titrated with dilute base to the point of neutralization. On the basis of the base consumed a degree of sulphonation of 93% was calculated.

EXAMPLE 2

An FEP film having a thickness of 125 μm was irradiated and grafted as in Example 1, whereupon a degree of grafting of 17% was calculated. Then the grafted film was sulphonated as in Example 1, whereupon a degree of sulphonation of 96% was calculated.

EXAMPLE 3

An FEP film having a thickness of 75 μm was irradiated as in Example 1, but with a dosage of 6 Mrad, and then grafted as in Example 1, but in pure styrene, whereupon a degree of grafting of 45% was calculated. Then the grafted film was sulphonated as in Example 1, whereupon a degree of sulphonation of 99% was calculated.

EXAMPLE 4

An FEP film having a thickness of 75 μm was irradiated with a dosage of 7 Mrad and then grafted, at −20° C., in a mixture of 40% by volume of α-methylstyrene and 60% by volume of toluene for 50 hours. After a further treatment as in Example 1, a degree of grafting of 19% was calculated. Then the grafted film was sulphonated as in Example 1, whereupon a degree of sulphonation of 88% was determined.

EXAMPLE 5

A film made of polyethylene (PE) and having a thickness of 150 μm was irradiated as in Example 1, but with a dosage of 2 Mrad, and then grafted as in Example 1, but in a mixture of 60% by volume of styrene and 40% by volume of benzene for 10 hours, whereupon a degree of grafting of 31% was calculated. Then the grafted film was sulphonated as in Example 1, whereupon a degree of sulphonation of 87% was calculated.

EXAMPLE 6

A film made of poly(vinyl fluoride) (PVF) and having a thickness of 100 μm was irradiated as in Example 1, but with a dosage of 4 Mrad, and then grafted as in Example 1, but for 10 hours, whereupon a degree of grafting of 29% was calculated. Then the grafted film was sulphonated as in Example 1, whereupon a degree of sulphonation of 94% was calculated.

EXAMPLE 7

A PVF film having a thickness of 100 μm was irradiated as in Example 1, but with a dosage of 10 Mrad, and then grafted as in Example 4, but for 60 hours, whereupon a degree of grafting of 28% was calculated. Then the grafted film was sulphonated as in Example 1, whereupon a degree of sulphonation of 86% was calculated.

EXAMPLE 8

An FEP film having a thickness of 50 μm was irradiated as in Example 1, but with a dosage of 6 Mrad, and then grafted as in Example 1, but in a mixture of 48% by volume of styrene, 32% by volume of divinylbenzene and 20% by volume of benzene, whereupon a degree of grafting of 19% was calculated. Then the grafted film was sulphonated as in Example 1, whereupon a degree of sulphonation of 92% was calculated.

EXAMPLE 9

An FEP film having a thickness of 75 μm was irradiated as in Example 1, but with a dosage of 6 Mrad, and then grafted as in Example 1, but in a mixture of 68% by volume of styrene, 12% by volume of divinylbenzene and 20% by volume of benzene, whereupon a degree of grafting of 25% was calculated. Then the grafted film was sulphonated as in Example 1, whereupon a degree of sulphonation of 94% was calculated.

EXAMPLE 10

An FEP film having a thickness of 75 μm was irradiated and grafted as in Example 8, whereupon a degree of grafting of 19% was calculated. Then the grafted film was sulphonated as in Example 1, whereupon a degree of sulphonation of 91% was calculated.

EXAMPLE 11

An FEP film having a thickness of 75 μm was irradiated as in Example 1, but with a dosage of 6 Mrad, and then grafted as in Example 1, but in a mixture of 30% by volume of styrene and 70% by volume of divinylbenzene and for 4 hours whereupon a degree of grafting of 15% was calculated. Then the grafted film was sulphonated as in Example 1, whereupon a degree of sulphonation of 90% was calculated.

EXAMPLE 12

An FEP film having a thickness of 125 μm was irradiated as in Example 1, but with a dosage of 6 Mrad, and then grafted as in Example 1, but in a mixture of 60% by volume of styrene and 40% by volume of divinylbenzene, whereupon a degree of grafting of 19% was calculated. Then the grafted film was sulphonated as in Example 1, whereupon a degree of sulphonation of 94% was calculated.

EXAMPLE 13

An FEP film having a thickness of 75 μm was irradiated as in Example 1, but with a dosage of 6 Mrad, and then grafted as in Example 1, but in a solution of 17.5% by weight of triallyl cyanurate in pure styrene, whereupon a degree of grafting of 29% was calculated. Then the grafted film was sulphonated as in Example 1, whereupon a degree of sulphonation of 88% was calculated.

EXAMPLE 14

An FEP film having a thickness of 75 μm was irradiated as in Example 1, but with a dosage of 6 Mrad, and then grafted as in Example 1, but in a solution of 7.5% by weight of triallyl cyanurate in a mixture of 10% by volume of divinylbenzene and 90% by volume of styrene, whereupon a degree of grafting of 40% was calculated. Then the grafted film was sulphonated as in Example 1, whereupon a degree of sulphonation of 90% was calculated.

EXAMPLE 15

An FEP film having a thickness of 75 μm was placed into a glass vessel which was filled with a mixture of 90% by volume of styrene and 10% by volume of divinylbenzene and which was then degassed by means of a number of freezing and thawing cycles. The glass vessel was then irradiated, in a thermostated $Co^{60}$ chamber, over a period of approximately 10 hours at approximately 60° C. with a dosage of 0.03 Mrad. The glass vessel was then opened, the film was removed and extracted for 5 hours using toluene in a Soxhlet apparatus. Then the film was dried in vacuo and weighed. On the basis of the increase in weight, a degree of grafting of 18%, based on the initial weight of the FEP film, was calculated.

The grafted film was placed into a glass vessel which contained a mixture of 70% by volume of 1,1,2,2-tetrachloroethane and 30% by volume of chlorosulphonic acid. The film was sulphonated in this mixture, with stirring, at 80° C. for 5 hours. The film was then removed, washed and dried. After a swelling operation in water, the film was titrated with dilute base to the point of neutralization. On the basis of the base consumed a degree of sulphonation of 94% was calculated.

EXAMPLE 16

With two porous gas diffusion electrodes (of the type ELAT from E-Tek in Natick Mass., U.S.A.), the active side in each case was sprayed, on a heatable support at 80° C., with a solution of a commercially available polymer (from Solution Technology, Mendenhall, Pa., U.S.A.) based on poly(perfluoroalkylene) sulphonic acid of the Nafion type (trademark of DuPont) by means of an atomizer until an increase in weight of 1 mg/$cm^2$ of electrode area had been achieved. The sprayed electrodes were then dried at 120° C. for 2 hours. Then the electrodes thus prepared were installed, together with a membrane film produced according to Example 8 and subsequently swelled in water at 100° C., in an electrochemical cell corresponding to FIG. 1. This electrochemical cell was operated as a fuel cell with hydrogen and oxygen at atmospheric pressure at 80° C. and was tested over a period of 1000 hours. At a current density of 1 A/$cm^2$, the following ohmic losses were determined as a function of the operating time:

| Operating time (h): | 20 | 250 1000 | 500 | 750 |
|---|---|---|---|---|
| Ohmic loss (mV): | 184 | 218 | 225 | 253 | 278 |

EXAMPLE 17

Two electrodes prepared according to Example 16 were installed, together with a membrane film produced according to Example 10 and subsequently swelled in water at 100° C. as in Example 16, in an electrochemical cell corresponding to FIG. 1. This electrochemical cell was operated as a fuel cell, as in Example 16, with hydrogen and oxygen at atmospheric pressure at 80° C. and was tested over a period of 1000 hours. At a current density of 1 A/$cm^2$, the following ohmic losses were determined as a function of the operating time:

| Operating time (h): | 20 | 250 1000 | 500 | 750 |
|---|---|---|---|---|
| Ohmic loss (mV): | 218 | 232 | 244 | 248 | 265 |

EXAMPLE 18

Two electrodes prepared according to Example 16 were installed, together with a membrane film produced according to Example 12 and subsequently swelled in water at 100° C. as in Example 16, in an electrochemical cell corresponding to FIG. 1. This electrochemical cell was operated as a fuel cell, as in Example 16, with hydrogen and oxygen at atmospheric pressure at 80° C. and was tested over a period of 1000 hours. At a current density of 1 A/cm$^2$, the following ohmic losses were determined as a function of the operating time:

| Operating time (h): | 20 | 20 1000 | 500 | 750 |
|---|---|---|---|---|
| Ohmic loss (mV): | 468 | 472 | 476 | 482 | 486 |

EXAMPLE 19

Two electrodes prepared according to Example 16 were installed, together with a membrane film produced according to Example 14 and subsequently swelled in water at 100° C. as in Example 16, in an electrochemical cell corresponding to FIG. 1, the thickness of the membrane film after swelling being 170 μm. This electrochemical cell was operated as a fuel cell, as in Example 16, with hydrogen and oxygen at atmospheric pressure at 80° C. and was tested over a period of 1000 hours. At a current density of 1 A/cm$^2$, the following ohmic losses were determined as a function of the operating time:

| Operating time (h): | 20 | 250 1000 | 500 | 750 |
|---|---|---|---|---|
| Ohmic loss (mV): | 90 | 101 | 113 | 141 | 179 |

EXAMPLE 20

A membrane film prduced according to Example 12 was coated, on a photoresist spin coater, a number of times on one of its sides with the Nafion solution mentioned in Example 16 in accordance with the spin coating method. Then the other side of the membrane film was coated in the same way. The thickness of the Nafion layer on each side of the membrane film was determined with a thickness gauge (digital pressure foot from Heidenhain) and typically gave values between 0.5 and 5 μm. The membrane was then left in an oven for an hour at 120° C. This membrane film, now coated on both sides with Nafion, was tested, together with two porous gas diffusion electrodes not impregnated (of the type ELAT from E-Tek in Natick, Mass., U.S.A.) in a fuel cell as in Example 16. At a current density of 1 A/cm$^2$, the following ohmic losses were determined as a function of the operating time:

| Operating time (h): | 20 | 250 1000 | 500 | 750 |
|---|---|---|---|---|
| Ohmic loss (mV): | 471 | 474 | 477 | 479 | 483 |

EXAMPLE 21

A membrane film produced according to Example 14 was coated on both sides with Nafion, according to Example 20, and tested in a fuel cell. At a current density of 1 A/cm$^2$, the following ohmic losses were determined as a function of the operating time:

| Operating time (h): | 20 | 250 1000 | 500 | 750 |
|---|---|---|---|---|
| Ohmic loss (mV): | 93 | 99 | 115 | 136 | 169 |

We claim:
1. An electrochemical cell, comprising:
   a pair of electrodes each having one electrode body made of porous base material which essentially consists of carbon particles held together by a binder and has pores which permit percolation of fluid through the electrode body, and in which the electrode body is charged with a catalyst deposited on the base material;
   a membrane film which is arranged between the electrodes, contacts the two electrode bodies electrochemically, acts as an electrolyte and separator of the electrochemical cell and is made of a hydrophillic, proton-conducting polymer material, an interlayer being provided between the membrane film and the base material with the catalyst deposited thereon;
   means for introducing a fluid into at least one of the electrodes;
   means for passing out a fluid from at least one of the electrodes; and
   means for making electrical contact with the electrodes;
   the material of the membrane film being a base polymer radiation-grafted with terminally sulphonated vinyl radicals;
   the base polymer being selected from the group formed by substituted and unsubstituted polyolefins, substituted and unsubstituted vinyl polymers and their copolymers;
   the vinyl radicals being derived from vinyl monomers which are selected from the group formed by substituted and unsubstituted vinyl monomers;
   the interlayer comprises a proton-conducting hydrophillic copolymer of poly(perfluoroalkylene) which is substituted with ion-exchanging groups, and poly(perfluoroalkylene) which is substituted with non-ion-exchanging groups; and
   the interlayer being applied to the membrane film.
2. The electrochemical cell according to claim 1, wherein:
   in the case of at least one of the electrode bodies, the interlayer envelops the base material, with the catalyst deposited thereon, the electrode body being impregnated in its pores with the proton-conducting hydrophillic copolymer.
3. The electrochemical cell according to claim 1, wherein:
   the base polymer is a polyolefin selected from the group formed by polyethylene, polypropylene, poly(tetrafluoroethylene), copolymer of poly(tetrafluoroethylene) and polyethylene, and copolymer of poly(tetrafluoroethylene) and poly(hexafluoropropylene).
4. The electrochemical cell according to claim 1, wherein:
   the base polymer is a vinyl polymer selected from the group formed by poly(vinyl fluoride), poly(vinyl chloride) and poly(vinylidene difluoride).
5. The electrochemical cell according to claim 1, wherein:
   the vinyl monomer is selected from the group formed by styrene, α-fluorostyrene, α-methylstyrene and parachloromethylstyrene.

6. The electrochemical cell according to claim 1, wherein:
the vinyl radicals radiation-grafted to the base polymer are cross-linked by radicals derived from a cross-linking agent.

7. The electrochemical cell according to claim 6, wherein:
the cross-linking agent is selected from the group formed by divinylbenzene and triallyl cyanurate and mixtures thereof.

8. The electrochemical cell according to claim 6, wherein:
the material of the membrane film contains radiation-grafted vinyl monomer radicals and cross-linking agent radicals in a relative weight ratio with respect to one another of up to approximately 60:40.

9. The electrochemical cell according to claim 1, wherein:
the material of the membrane film contains from 15 to 45% by weight of radiation-grafted vinyl monomer radicals.

10. The electrochemical cell according to claim 1, wherein:
the membrane film has a thickness of more than approximately 50 μm.

11. The electrochemical cell according to claim 10, wherein:
the membrane film has a thickness of 80 to 170 μm.

12. The electrochemical cell according to claim 1, wherein:
said cell is a fuel cell;
one of the means for introducing a fluid is a means for introducing a gaseous fuel into the one electrode;
another of the means for introducing a fluid is a means for introducing a gaseous oxidant into the other electrode; and
one of the means for passing out a fluid is a means for passing out reaction products from the combustion reaction between the fuel and the oxidant from the one electrode.

13. The electrochemical cell according to claim 12, wherein:
said cell is an electrochemical cell which is alternatively operable as a fuel cell and an electrolytic cell.

14. The electrochemical cell according to claim 12, wherein:
another of the means for passing out a fluid is a means for passing out inert gases, which have been supplied with the gaseous oxidant, from the other electrode.

15. The electrochemical cell according to claim 2, wherein:
said cell is an electrolytic cell;
the means for introducing a fluid is means for introducing a starting material to be electrolysed,
and the means for passing out a fluid is a means for passing out reaction products from the electrochemical decomposition of the starting material.

* * * * *